Nov. 19, 1957     J. C. CURTIS     2,813,515
TELESCOPIC UNIFORM PRESSURE PROVIDING APPARATUS
Original Filed April 5, 1950     4 Sheets-Sheet 1
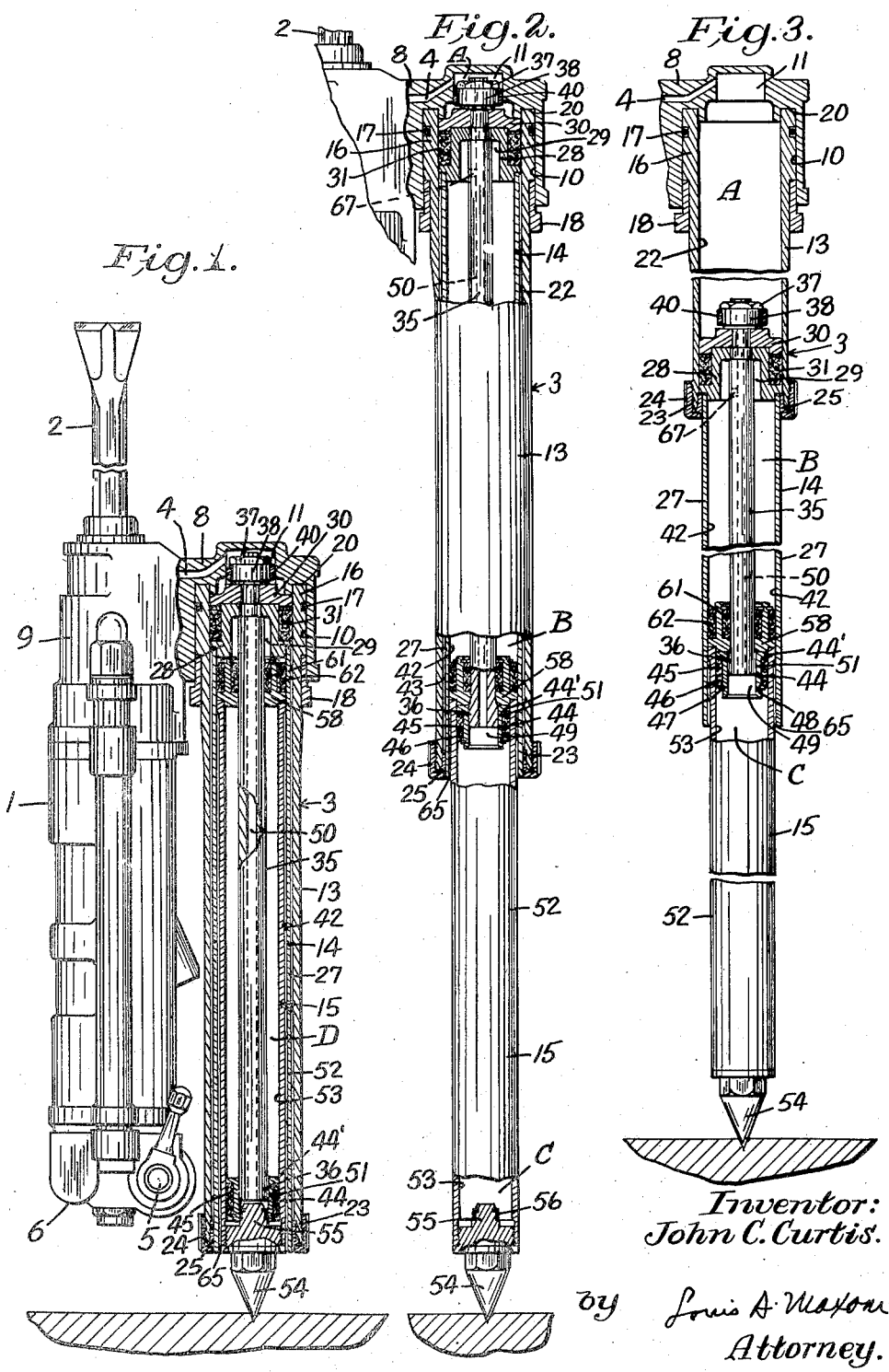
Inventor:
John C. Curtis.
by Louis A. Maxon
Attorney.

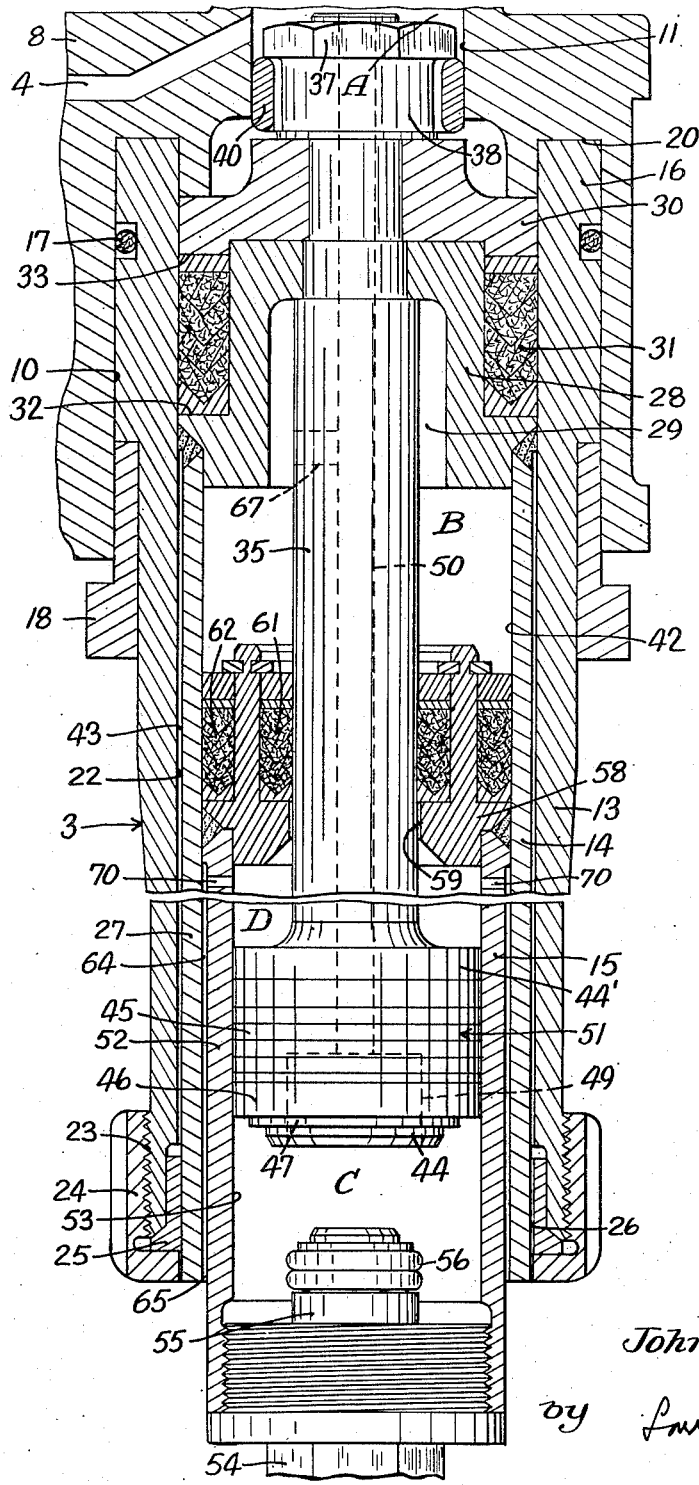

Nov. 19, 1957  J. C. CURTIS  2,813,515
TELESCOPIC UNIFORM PRESSURE PROVIDING APPARATUS
Original Filed April 5, 1950  4 Sheets-Sheet 3
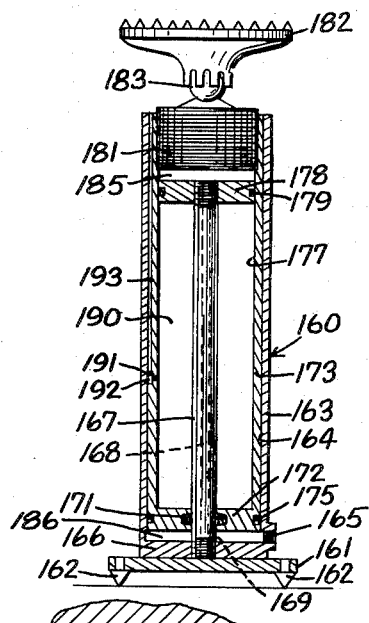
Fig. 9.
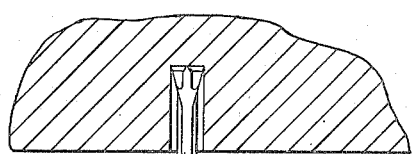
Fig. 6.
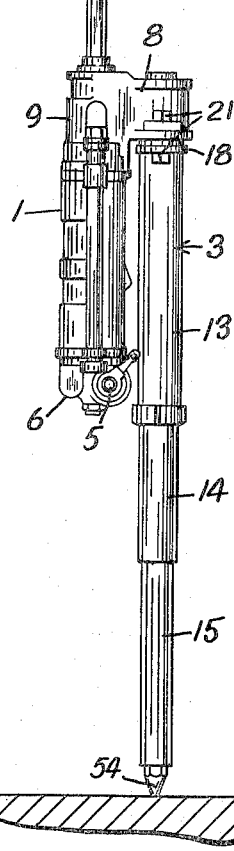
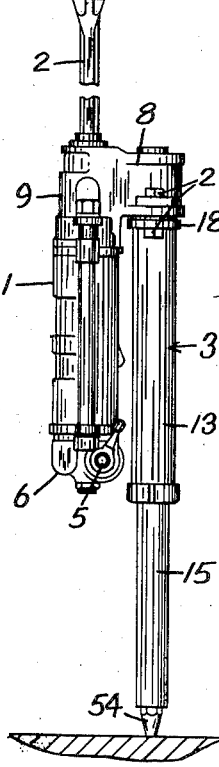
Fig. 5.
Inventor:
John C. Curtis.
By Louis A. Watson,
Attorney.

Nov. 19, 1957  J. C. CURTIS  2,813,515
TELESCOPIC UNIFORM PRESSURE PROVIDING APPARATUS
Original Filed April 5, 1950  4 Sheets-Sheet 4
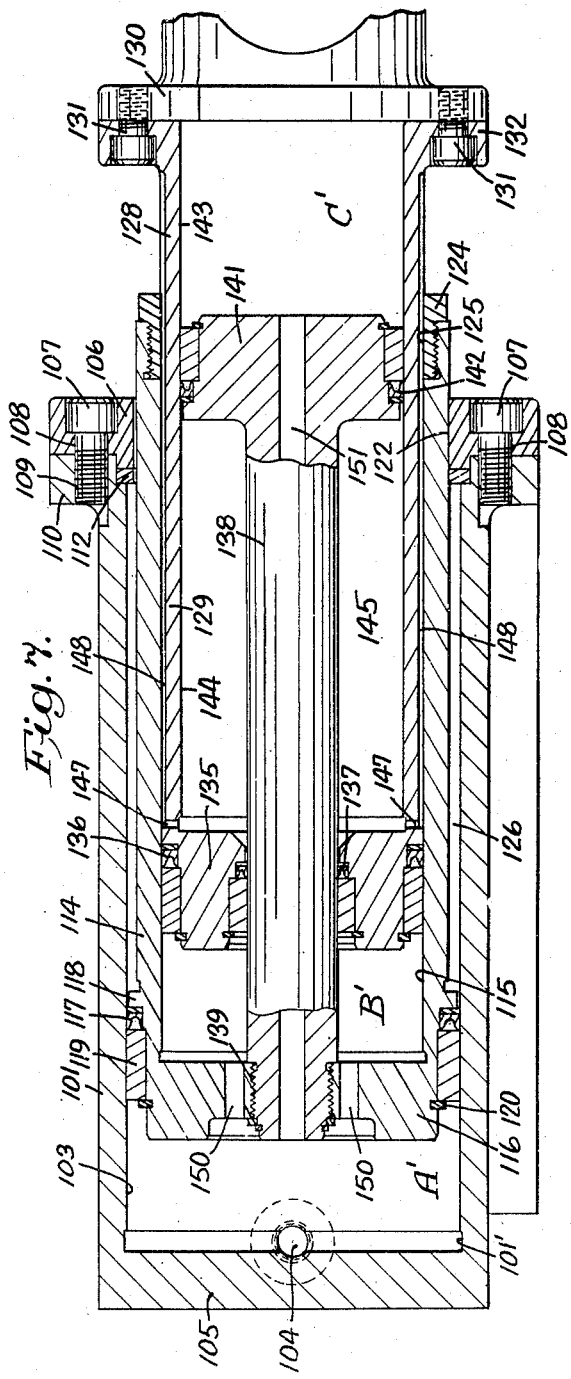
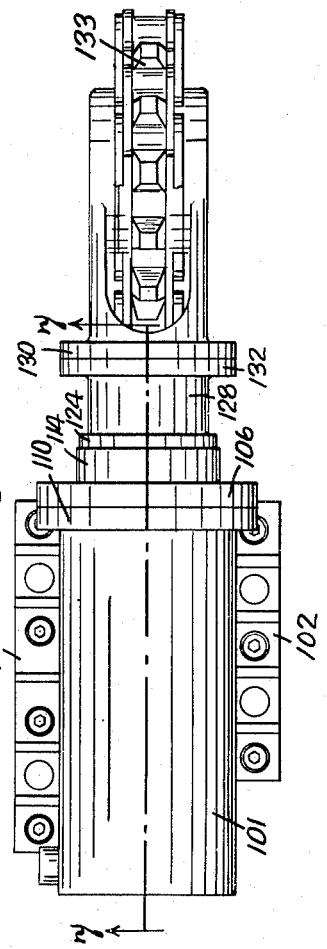
Inventor:
John C. Curtis.
by Louis A. Maxson
Attorney.

Patent 2,813,515 …

United States Patent Office

2,813,515
Patented Nov. 19, 1957

2,813,515

TELESCOPIC UNIFORM PRESSURE PROVIDING APPARATUS

John C. Curtis, Newport, N. H., assignor to Joy Manufacturing Company, Pittsburgh, Pa., a corporation of Pennsylvania Continuation of abandoned application Serial No. 154,143, April 5, 1950. This application April 28, 1955, Serial No. 504,500

14 Claims. (Cl. 121—9)

This invention relates to expansible chamber devices, and from one aspect to motors for exerting feeding pressures, operating pressures and the like; and from another aspect it relates to motors for exerting holding or supporting pressures, for example, but without limitation thereto, jack devices.

Considering the invention from the first aspect, it is well known that on such devices as stoper feeds it has heretofore been necessary to employ feed cylinder and piston devices of substantial initial collapsed length, or else to encounter such complications as un-uniform feeding pressures, and considerably increased overall diameters of feed mechanisms if recourse was had to constructions in which a plurality of relatively movable coaxial feed pistons are employed. From this aspect of the invention, its primary object is to provide an improved feeding (or operating) mechanism of the expansible chamber type which shall be very compact longitudinally when collapsed, have a large capacity for extension, provide, except where it is desired to have a different mode of operation, substantially uniform feeding pressures in all degrees of extension, and be able to exert, irrespective of its degree of expansion, a pressure equal to the product of the pressure of the fluid acting within it, multiplied by a uniform factor. Another object, from this aspect of the invention, is to provide an improved feeding apparatus (or, more broadly, an improved servo-motor) having an operating range greater than the length of any single element thereof, and including relatively telescopic elements one of which constitutes a primary cylinder element, one of which constitutes a piston element having plural areas thereon upon which pressure fluid acts cumulatively to effect an operating or feeding movement of said element, and, at least one intermediate element longitudinally movable relative to both of said previously mentioned elements and which, through its presence, enables movements of extension and contraction between the two elements previously mentioned of greater length than the length of either of the same and a uniformity of exerted feeding or operating force. It will be understood that the piston-constituting element can be caused to have, if desired, an effective pressure area actually greater than that of the primary cylinder element.

From the other aspect of the invention a primary object is to provide a jack or the like device of the cylinder and piston type which shall be able to exert a force between the abutments which it engages greater than the product of the acting pressure per square inch multiplied by the cross-sectional area of the largest cylinder bore within said device.

Other objects and advantages of the invention will hereinafter more fully appear.

In the accompanying drawings, in which two illustrative embodiments of the invention from its first aspects, and one illustrative embodiment of the invention from its second aspect, are shown for purposes of illustration:

Figure 1 is a view, with the drilling motor shown in elevation and the feeding motor shown in section and with parts broken away, of a stoper having a compact feed in which the invention from one illustrative embodiment thereof is incorporated, Figure 2 is a view, partially in elevation and partially in central longitudinal section, and with the hammer motor broken away, of the stoper of Fig. 1, with the feed partially extended, Figure 3 is a view, partially in elevation and partially in central longitudinal section, with parts broken away, of the stoper of Figs. 1 and 2, showing the feeding apparatus of the stoper fully extended, Figure 4 is a central longitudinal sectional view, on a much enlarged scale, and with parts broken out, showing the feeding structure of Figs. 1 to 3 just after feed has started, i. e. with the parts somewhat moved from the relative position of Fig. 1 but nowhere near the position of Fig. 2, Figure 5 is a side elevational view, on a smaller scale, of the stoper of Figs. 1 to 4, showing the feed about half extended, Figure 6 is a view of the same stoper, with the feed nearly fully extended, Figure 7 is a central longitudinal section taken on the line 7—7 of Figure 8, and on an enlarged scale, showing a servo-motor in which the invention is embodied, Figure 8 is an elevational view on a smaller scale, of the servo-motor of Figure 7, Figure 9 is a view, mainly in central longitudinal vertical section, through a roof jack in which the invention is embodied in one of its aspects.

Referring to the drawings, and first to Figs. 1 to 7 thereof, it will be noted that a hammer motor 1, adapted to actuate a drill steel 2 percussively, is provided with a feeding mechanism which is generally designated 3. This feeding mechanism is of the pressure fluid extended type, and fluid (herein air under pressure) is adapted to be supplied to it and vented from it via a conduit 4, as under the control, in a well-known manner, of a valve mechanism 5 mounted at the rearward end 6 of the hammer motor 1.

The feeding mechanism 3 supports the motor 1 through a bracket 8 extending laterally from a casing 9 at the forward end of the motor 1. This bracket is formed with a bore 10, of larger diameter, and a communicating smaller bore 11. The conduit 4 opens into the bore 11, and the bore 10 is adapted to receive and to have clamped therein the forward end of the feeding mechanism 3.

The feeding mechanism 3 includes, as shown, three telescopically arranged elements 13, 14 and 15. The element 13 is a feed cylinder element. It has a somewhat enlarged forward end portion 16 received in the bore 10 and provided with a peripheral seal 17, and is clamped by a clamping ring 18 tightly against the forward wall 20 of the bore 10. The clamping ring may be secured to the bracket 8 in any suitable manner, as by bolts and nuts as at 21 (see Figs. 5 and 6). The cylinder element 13 has a cylindrical bore 22, in which the element 14 is reciprocably received. To the threaded rearward end 23 of the element 13 there is attached an internally flanged nut element 24 engaging a stop sleeve 25 to prevent inadvertent escape of the element 14 from the bore 22. The stop sleeve 25 may be grooved as at 26 to permit a breathing action later mentioned.

The element 14 may be considered, at least for the moment, primarily as an extension element. It also performs both piston and cylinder functions. It comprises a tubular portion 27 having a head 28 suitably secured to it. The head 28 is recessed at 29 and has secured to it a forward head portion 30. A suitable packing 31 is clamped between shoulders 32 and 33, respectively formed on the head 28 and the forward head portion 30. A rod 35, having a somewhat enlarged rearward end 36 and a stepped forward end, with which a nut 37 coacts, extends rearwardly from the head 28, and the nut clamps the head 28, the head portion 30 and a sleeve 38 together. A spring split ring 40 surrounds the sleeve 38 and is adapted to enter the recess 11 to hold the feed yieldingly in collapsed position. Fluid supplied through the passage 4 may pass freely by the ring 40. The tubular portion 27 has a cylindrical bore 42 in which there is slidably received the element 15. There is a small annular space 43 within the bore 22 and outside of the tubular portion 27, and this space is vented, as by the groove 26 earlier mentioned.

The rod 35 has welded to its head 36 a sleeve 44 having an outwardly projecting flange 44' against which a packing 45 is held by a follower ring 46 held on the sleeve by a split ring 47 received in a groove 48 in the sleeve 44. The packing cooperates with the wall of a bore in the element 15, as will shortly appear. The sleeve 44 projects rearwardly beyond the end of the rod 35, thus providing a cylindrical socket 49. The rod 35 is traversed throughout its length by a fluid conducting passage 50 which opens through the opposite ends of the rod. For further reference the head 36, flanged sleeve 44, packing 45, follower ring 46, etc. may be regarded as constituting a head 51.

The element 15 is a piston element, but also plays a cylinder function. It includes a tubular cylindrical portion 52 having a cylindrical bore 53. The packing 45 coacts with the wall of the bore 53. The rearward end of the bore has suitably connected to it a ground-engaging point 54 at whose forward side is a protuberance 55 surrounded by a spring 56, and the spring is adapted to cooperate with the socket 49 in holding the parts of the feed releasably in collapsed position. The tubular portion 52 has a perforated head 58 secured to it at its forward end. The head 58 is traversed by a bore 59 through which the rod 35 extends, and has packings 61 and 62 secured to it and respectively coacting with the rod 35 and the wall of the bore 42. It will be noted that the annular clearance 64 between the wall of the bore 42 and the exterior of the tubular portion 52 is vented at the rear of the tubular portion 27, as at 65.

It will be observed that the passage 50 is connected by a radial port 67 with the space within the tubular portion 27.

Between the sleeve 44 and the head 58 there is a chamber D annular in cross section, and this chamber is connected through passages 70 with the annular clearance space 64 which surrounds the member 15 and is vented at 65.

From what has been said it will be understood that the structure described provides three expansible motor chambers: A, in the element 13; B, in the element 14; and C, in the element 15. All of these are in communication with each other, A with C through the passage 50, and A and C with B through the passage 50 and the radial port 67.

Referring now to Fig. 4, it will be noted that the member 15, with the parts in position for vertical upward feed will have no tendency to move the point 54 off of the surface which supports it, being held down by gravity and by a pressure equal to the feeding pressure per square inch operative, multiplied by the sum of the cross-sectional area of the bore 53 plus the cross-sectional area of the annulus between the wall of the bore 42 and the wall of the rod 35.

The part 14 when in the position shown in Fig. 3 will, disregarding the pull exerted on it by the member 13, tend to be held against downward movement by a pressure equal to the product of the acting feeding pressure per square inch multiplied by the sum of (a) the full cross section of the head 51 minus the cross section of the passage 50 plus (b) the area of the annulus between the wall of the bore 42 and the wall of the rod 35, i. e. the effective area of the lower surface of head 28. The weight of the part 14 and the product of the acting feeding pressure per square inch multiplied by the remainder, after the subtraction from the cross-sectional area of the head 30 of the cross-sectional area of the passage 50, will tend to move the part 14 down. The resultant of the several oppositely acting pressures mentioned may be a net upward pressure, a net downward pressure, or a balanced condition, all depending on the areas chosen in design. The upward pressure will, through the proportioning of parts, preferably be made slightly—desirably very slightly—to exceed the downward, so the member 14, during the feeding movement from the relative position of the parts in Fig. 2, to that in Fig. 3, will remain in the relation to part 15 shown in Figs. 2 and 3. It is to be noted, with respect to member 14, that the cross-sectional area of the head 30 will be determined by the cross-sectional area of the bore 22, and the areas identified as (a) and (b) above will be largely determined by the desired cross sections of the bore 53 and of the annular chamber B. These cross sections will desirably be close, in sum, to the cross-sectional area of the bore 22, being made cumulatively slightly to exceed, to equal, or to be slightly less than the last area as may be desired.

Part 13 will tend to be moved upwardly in transit between the position of Fig. 2 to that of Fig. 3, by the product of the feeding pressure multiplied by the cross-sectional area of the bore 22, i. e. the effective area of the surface 20 exposed within the bore 22 and the cross-sectional area of the recess 11. It will have its upward movement opposed by its own weight and the weight of the hammer motor, etc. Evidently the acting feeding pressure will be made large enough to effect feed when feed is desired. Accordingly, from the position of the parts shown in Fig. 1 to that shown in Fig. 2 member 15 will remain stationary, the member 13 and the hammer motor will move upwardly, and the member 14 will either occupy the position with respect to the member 13 shown in Figs. 1 and 2 or will remain behind, depending on whether the cross-sectional areas of chambers C and B exceed the cross-sectional area of the chamber A at least enough to enable raising the weight of the element 14. It will be understood that herein it is assumed that motion is so slow that substantial equalization of pressure in the chambers is at all times effected.

When the flange 44' on the rod 35 engages the stationary upper head 58 of the element 15, it will be evident that the member 14 will not be able to move upwardly with the member 13, and so it will remain stationary with the member 15, while the member 13 moves upwardly relative to it (14), and further upwardly relative to the member 15.

If the cross-sectional areas are so selected that the member 14 lags behind the member 13, and remains with the member 15 during the first half of the feeding movement of member 13, it will be picked up by the member 13 and advanced with the latter relative to the member 15, when the bushing 25 engages the head 28.

The situation with respect to the embodiment of the invention so far described may be summarized as follows. Different results may be secured by varying the ratio of the sum of the cross-sectional areas of the circular chamber C and of the annular chamber B to the cross-sectional area of the chamber A in the feed cylinder element 13. In a stoper feed, it may desirably slightly exceed unity, and indeed it may be desirable to have the ratio of (a) the sum of the cross-sectional area of the annular chamber B plus the cross-sectional area of the chamber C minus the cross-sectional area of the port 50 to (b) the cross-sectional area of the chamber A slightly greater than unity. In such cases allowance for the weight of element 14 may be made. During upfeed with such an arrangement, and with the air pressures at least substantially equal in the several chambers, elements 13 and 14 will be moving together in lifting the drilling motor until the position of the parts of Fig. 5 is reached, and thereafter, as shown in Fig. 6, the part 14 will be stationary as the part 13 goes on up.

When horizontal forces are to be exerted, the ratio of the areas of elements corresponding to elements 14 and 15 to the ratio of the area of an element corresponding to the element 13 may be made equal to unity, or it may even be made a little less than unity if the passage connecting the chambers corresponding to the chambers A and C be taken into consideration, but this is so small as to be negligible, and it will be observed that if the cross-sectional areas of the B and C chambers be just equal to the cross-sectional area of the A chamber, the presence of the hole 50 or an equivalent will not effect the actual feeding force exerted on the device to be more.

In Figs. 7 and 8 there is shown an illustrative embodiment of the invention in which the structure is a servo-motor for use on kerf cutting machines for effecting bar swing. It includes a cylinder member 101 having flanges 102 secured to it by means of which it may be bolted to any suitable mounting surface. The cylinder 101 has a cylindrical bore 103, and fluid is adapted to be supplied to the bore through a fluid supply passage 104, which passage also is adapted to act as a vent passage when pressure is to be released from the bore of the cylinder 101. Passage 104 opens into a counterbore 101'. The cylinder 101 has a rear head portion 105, and a front head portion 106 is attached to the cylinder member 101 as by machine screws 107 extending through openings 108 in the head portion and entering threaded bores 109 in a flange 110 shown as formed integrally with the cylinder member 101. A notched ring 112 is provided to reduce the possibility of dirt attaining to the bore 103, but, as will later appear, a tight seal is not provided, as provision must be made for breathing during relative motion with respect to the cylinder member 101 of an element 114 which is mounted in it. The element 114 is generally cylindrical and it has a generally cylindrical bore 115. It has an integral rear head 116 on the periphery of which there is supported a packing 117 located between a radially projecting circumferential flange 118 and a follower ring 119 held in position by a split snap ring 120. The member 114 extends through a generally circular but notched opening 122 in the front head portion 106 upon the cylinder member 101, and it is provided with a ring 124 threadedly mounted at its forward end, the bore 125 of the ring 124 corresponding in diameter with the bore 115 of the member 114. Without now considering what may cause the member 114 to move longitudinally within the bore 103, or under what circumstances such motion may take place, it may be noted that such motion may take place and that an annular chamber 126 formed between the packing 117 and the ring 112 breathes during such relative motion as above explained. The member 114 has reciprocably mounted within its bore 115 a piston structure 128. This includes a tubular body 129, whose forward end is closed by head 130 secured in position by machine screws 131 passing through a radially extending flange 132. As shown in Fig. 8, the head 130 provides a bearing for a sprocket 133 which coacts with cutter bar swinging apparatus, in the case of the particular mechanism shown. At the rear end of the sleeve or tubular portion 129 there is mounted a head 135 having external packing 136 mounted upon it, and also having an internal packing 137, the latter providing a sealing engagement with a rod portion 138. The packings 136 and 137 are analogous to the packing 117, and similarly mounted, save as the fact that 137 is an internal packing introduces differences. The rod portion 138 is threaded at its rear end, at 139, into the rear head 116 of the member 114; and at its forward end carries a head 141 provided with a packing 142 sealingly engaging the wall 143 of the bore 144 of the member 129 and aranged similarly to the packing 117. It will be noted that upon relative reciprocation between the member 129 and the head 141 there will be necessary a breathing action between the chamber 145 which surrounds the rod 138 and exists, with variable volume, between the head 141 and the head 135, and this breathing is effected through radial passages 147 opening from the chamber 145 into longitudinal grooves 148 in the body 129. The head 116 is traversed by a plurality of passages 150, and the rod 138 is traversed by a longitudinal passage 151. It may now be noted that there are provided in the apparatus so far described in connection with Figs. 7 and 8, three chambers in which, assuming adequate sizes of the passages 150 and 151, there may be assumed to exist like pressures. These chambers are: A chamber, C', between the head 141 and the head 130, a chamber, B', between the heads 135 and 116, and a chamber, A', between the heads 116 and 105. There are also provided two annular spaces 126 and 145 which communicate sufficiently freely with the atmosphere so that upon relative movement of the parts, there will be effected no substantial changes of pressures in these annular chambers. Fluid may also be displaced as necessary to accommodate movements of the head 135.

It may here be noted that the annular space 126 would not need to be provided, if it were not for the particular construction used to prevent the member 114 from overmovement outwardly, and the annular chamber 145 could obviously be vented in other ways—as through ports bored longitudinally through its wall and communicating with the exterior of the member 128 at a point adjacent the flange 132.

Now let it be supposed, for purposes of illustration, and without limitation thereto, that the cross-sectional area of the chamber A' is 28.27 sq. in., the cross-sectional area of the chamber C' 12.57 sq. in., and the cross-sectional area of the annular chamber B' 15.65 sq. in. These can obviously be varied but the proportions mentioned will provide very satisfactory results and almost absolute uniformity of feeding force in a device for the purpose for which the one now being described is employed.

Before proceeding further, it should be noted that the relative position of the parts shown in Fig. 7 is not one which will necessarily be attained during normal use of the device; but the position shown has been illustrated to indicate that with such a ratio of areas what relative motions may occur during certain portions of the motions of the parts is not predictable and it is in fact immaterial.

The mode of operation of this embodiment of the invention will be more readily comprehended if it be kept in mind that the pressures in the chambers A', B' and C' will be at least approximately uniform, except in the event of very rapid relative movement of some part relative to another. There will accordingly, on the assumptions as to areas previously mentioned, and with the parts in the positions shown in Fig. 7, be a push exerted on the member 128 equal to the pressure, which we may call P, multiplied by the sum of $15.65+12.57$ in a forward direction, while there will be no oppositely facing areas on this portion of the device subjected to a pressure produced by the fluid pressure P. The member 101 will, of course, be held stationary, and thus the only remaining question will be that as to the motion of the member 114. This member will be subjected to a pressure in the forward direction equal to $P \times (28.27$ minus the cross-sectional areas of the passages 150 and 151), while it will be subjected to a cumulative pressure in the opposite direction equal to $P \times (15.65+12.57$—the cross-sectional areas of the passages 150 and 151). It will therefore be evident that with the pressures so closely balanced all that one can be sure of is that there will be almost certain to be no appreciable difference in force exerted throughout the full operating range of the servo-motor. By proper designing the differentials can be made more or less, or a negative one, so to speak—whatever is preferred as indicated by the conditions to be met. In the present case, since the apparatus operates in horizontal planes, the weight of the parts does not enter into consideration as a factor, which is contrary to the conditions which would exist in the first embodiment of the invention, though, with respect to the first embodiment, it is to be noted that with the provision of a cross-sectional area of the bore of the element 13, adequate for its purpose, the matter of the proportioning of the other areas is elementary for one having available my invention, and will simply involve a satisfactory relation of the cumulative areas facing forwardly on the element 15.

Reference may now be had to Fig. 9 and to the jack embodiment of the invention, and it will be observed that a jack device 160 is shown, this including a bottom engaging plate 161 desirably having projections 162 to prevent its slipping on the bottom. The plate 161 carries a vertical cylinder 163 having a bore 164 to the lower end of which fluid is adapted to be admitted under any suitable control through a passage 165. The lower head 166 of the cylinder 163 carries a tubular cylindrical column element 167 traversed by a passage 168 which communicates through a radial passage 169 with the space into which the passage 165 opens. A suitable packing 171 is carried by the lower head 172 of a piston structure 173, this packing cooperating with the periphery of the column element 167. The lower head 172 also has a packing 175 at its outer periphery, this last packing co-operating with the wall of the bore 164 of the cylinder 163. The piston 173 has a cylindrical bore 177 and the column element 167 has a head 178 fixed to it and in fixed relation to the lower head 166 of the cylinder 163. The head 178 has a packing 179 to provide a seal between the spaces above and below the head 178. The member 173 has an upper head 181 and above the head 181 there is mounted in any suitable manner a roof-engaging plate 182, the support for the latter desirably including a ball and socket connection 183 so as to permit tilting of the roof-engaging element 182.

It will be evident that there are two chambers 185 and 186 with which fluid admitted through the passage 165 will freely communicate. Each of these chambers has a movable wall and a stationary wall. The stationary walls are provided by the bottom head 166 and by the spaced upper head 178. The movable heads, which move together, are provided by the lower surface of the head 172 and the lower surface of the head 181. With a cross section of the column member 167 properly chosen, it will be evident that the surfaces last mentioned may very substantially exceed the full cross-sectional area of the bore of the cylinder 163. Thus a very powerful expanding force may be exerted by the jack, a force much greater than could be obtained by simply employing a moving piston having but one area acted on by pressure— even though that area might be equal to the full cross section of the bore 164.

It may be noted that between the heads 172 and 178 there is a chamber 190, of which the volume is changed as the jack is expanded and contracted. In order to prevent substantial pressure changes in this chamber it is vented to atmosphere as through one or more radial ports 191 opening into an annular groove 192, which annular groove communicates continuously with one or more longitudinal grooves 193 formed as may be preferred either in the outer periphery of the member 173, or in the inner periphery of the member 163 and opening through the longitudinally grooved ends of one of these members.

Upon the admission of fluid through the passage 165 it flows beneath the head 172 and through the hollow column element 167 to the space above the head 178 carried by the element 167, where it acts on the head 181. Accordingly, the piston structure is forced upwardly by a pressure considerably greater than the action of the same fluid pressure on a single piston of the full cross section of the bore 164 would produce. It will be observed that the relationship of the piston structure 173 to the cylinder 163 and column element 167 is quite similar to the relation between the elements 15 and 14 and the members 128 and 114, though the cumulative areas in the structure of Fig. 9 bear a higher ratio to push obtainable with a given feeding pressure from a single cylinder with a given area than in the earlier forms. Of course gaseous or hydraulic fluids may be supplied to the conduit 165, and the pressure may be maintained by closing such conduit after fluid has been supplied through it, perhaps, with a hydraulic fluid, with the use of an accumulator or the like.

No extended discussion of the advantages of the invention in its different aspects is now needed. It will be evident that a very compact and powerful feed, servomotor and jack are made available. The feed may be made uniform and when it is to be used vertically it may be caused to compensate for the weight of constituent elements. The feature of a cylinder element having a coaxial head element in fixed spaced relation to its head, together with a piston element having a pair of spaced heads connected by a cylinder element which coacts with said coaxial head, with fluid acting on spaced areas is one of various concepts common to the different aspects of the invention. Others will appear in the course of the appended claims.

This present application is a continuation of my application Serial No. 154,143, filed April 5, 1950, for Telescopic Uniform Pressure Providing Apparatus, now abandoned.

While there are in this application specifically described three forms which the invention may assume in practice, it will be understood that these forms of the same are shown for purposes of illustration and that the invention may be modified and embodied in various other forms without departing from its spirit or the scope of the appended claims.

What is claimed is:

1. In combination, a cylinder having a head and a bore, another cylinder having heads one at each end thereof and a bore, one of said last mentioned heads being perforate, a third cylinder arranged coaxial with and between said first two cylinders and having a head fitting said first mentioned bore and a rod carried by said last mentioned head and in turn supporting a further head fitting and disposed within said second mentioned bore, said rod extending through said perforate head and slidingly engaged thereby, and means for admitting fluid to act on unidirectional facing surfaces one on each of the heads of said second mentioned cylinder and one on the head of said third cylinder.

2. The combination defined in claim 1 in which the cumulative areas of said surfaces on the heads of said second mentioned cylinder are equal to the area of said surface on the head of said third cylinder.

3. In an expansible chamber device, a cylinder having a head and a bore, a cylinder-providing member reciprocably mounted in said bore and having a head and a rod fixed to its head and projecting therefrom within the cylinder of said cylinder-providing member, said rod also having a head mounted on it at a point remote from the head to which said rod is fixed, a hollow piston having spaced heads connected by a tubular wall, said tubular wall providing a cylinder fitting the head on said rod and said head on said rod being intermediate the spaced heads of said hollow piston, one of said spaced heads being nearer said first mentioned head than the other is, and said spaced head nearer said first mentioned head being annular and slidably engaging said rod, and means for conducting fluid under pressure to the space between the other of said spaced heads and said head on said rod, to the space between said first two heads mentioned, and to the space in said cylinder-providing member between the head of the latter and the head of said hollow piston which is nearer thereto.

4. An expansible chamber device according to claim 3 in which the means for conducting fluid under pressure includes an axial passage extending through the rod and communicating with each of the three spaces specified.

5. In a fluid actuated expansible chamber device, a cylinder element having a bore, an element reciprocably received in said bore and having a smaller bore, a third element reciprocably received in said second bore and having a still smaller bore, an element fixed with respect to said second element and reciprocably received in said last bore, said fourth element having a rod connecting it to said second element and extending within said second bore, the cumulative cross-sectional areas of said third bore and of the annulus between said rod and said second bore being at least substantially equal to the area of said first bore.

6. In a telescopic feeding mechanism, a member to be fed and three coaxial feeding elements telescoping into relative positions in which all three are cut by at least one plane perpendicular to the line in which their axes lie and extensible longitudinally so that each is cut concurrently with but one of the others by a plane perpendicular to the line in which their axes lie and each of said elements with at least one of the others forming an expansible chamber for the action of a work-performing fluid under pressure providing a forward feeding force for said member, two of said expansible chambers having bounds including transversely extending wall portions which are movable to increase the volumes of said chambers and which have extending between them means for maintaining them in fixed spaced relation to each other and which present combined transverse areas subjected to fluid pressure to effect extension of said feeding mechanism which are at least substantially equal to the transverse area of the third expansible chamber subjected to fluid pressure to effect extension of said feeding mechanism, whereby uniformity of feeding force is provided in all of the relatively extended positions of said feeding elements.

7. In an expansible power mechanism, three coaxial feeding elements telescoping into concentric relation and each with at least one of the others forming an expansible chamber into which a working fluid is admitted to effect extension of said power mechanism, two of said expansible chambers having bounds connected in fixed relation to each other for movement together to increase their volumes simultaneously during extension of said mechanism to effect feeding, and having combined areas on which fluid acts to effect such extension substantially equal to the area of the third on which fluid acts to effect extension to effect feeding but differing from the latter area by an amount appropriate to compensate for the weight of one of said elements.

8. In combination, a member to be moved, and a telescopic feed for said member, including two coaxial feed cylinder and piston units each extensible to effect feeding of said member in a common direction and collapsible into a length not substantially exceeding the length of said member and in a position having little projection beyond either end of said member, and extensible to a length exceeding double the length of said member to be moved to effect feeding of the latter a distance exceeding the extreme range of extension of either of said units individually, said units having substantially equal feeding pressure subjected areas of which one is made up of two portions cumulatively equal to a single area constituting the other.

9. In a stoper drill, a hammer motor, and feeding mechanism therefor for moving the same through an extended range in one direction including a feed cylinder connected to said motor to feed the same, a hammer motor feeding element telescopically receivable in said feed cylinder and having an abutment engaging point engageable with a surface away from which such feeding is to be effected, means for subjecting said feed cylinder and said hammer motor feeding element to a feeding pressure to force them oppositely longitudinally to effect such feeding, and an element intermediate said first two elements and slidable relative to each of the same and having pressure areas facing oppositely thereon and acted on respectively by the feeding fluid which acts within said feed cylinder and upon said hammer motor feeding element, the oppositely facing pressure areas being substantially equal.

10. In combination, in an expansible chamber, fluid actuated, thrust-exerting device for imparting movement to a member to be moved, an element adapted to act as an abutment, an element movable longitudinally relative to said last mentioned element and adapted to transmit the thrust to be exerted to a member to be moved, and still another element movable longitudinally with respect to each of the other elements of said expansible chamber device and slidably engaging both of the same and precluding direct contact between the same, said several elements of said expansible chamber device being telescopically arranged with their axes all parallel to a common straight line, and having in differently telescoped relations a relative position in which all of said elements are intersected by a plane to which the axes of said elements are perpendicular and another relative position in which such plane intersects not more than two of such elements, means for delivering fluid to act on one of said first two elements, and means including a passage in said still another element in constant communication with both of said first two elements for transmitting fluid delivered to said one of said first two elements to act thereon to act on the other of said first two elements to effect thrust exertion as aforesaid.

11. In combination, a cylinder element, an element between which and said cylinder element there is movability in a direction longitudinal of said cylinder element between a relative position in which said second element is partially within said cylinder element and another relative position in which said second element is wholly exterior to said cylinder element, each of said elements presenting at least one area upon which fluid pressure acts to produce a force effecting movement between said elements from the first mentioned relative position to the second mentioned relative position, and an element intermediate said first two elements and slidable longitudinally relative to each of the same, said third mentioned element having surfaces thereon facing oppositely longitudinally thereof and each subjected to fluid pressure continuously during the existence of a force as aforesaid, the effective areas of said surfaces on said third mentioned element facing oppositely longitudinally thereof being the same, whereby the fluid pressure to which said surfaces are subjected exerts on said third element equal and opposite longitudinal forces offsetting each other.

12. In an apparatus of the character described, a fluid actuated feed device for advancing a working implement toward its work and maintaining it against the latter, said device including a first cylinder element fixedly connected to the working implement, a second cylinder element having a piston thereon and movable within the cylinder element which is fixed to the implement, said first and second cylinder elements each having an end more remote from the connection of said first cylinder element to the working implement and said end of said second cylinder element projecting through said end of said first cylinder element, an element having a piston at one end and an external abutment-engaging member at its other end, said last mentioned element slidably received in said second cylinder element and extending through the aforesaid end of said second cylinder element, said several elements being coaxial, and means for supplying fluid to said feed device to effect extension thereof from a relative position in which all of said elements are intersected by a plane to which the axes of the elements are perpendicular to another relative position in which such plane intersects not more than two of said elements, certain of said elements cooperating to provide throughout the entire period during which the working implement is advanced to its work oppositely facing surfaces of like effective areas bounding an expansible chamber in which the implement advancing force is developed.

13. In an apparatus of the character described, a fluid actuated feed device for advancing a working implement toward its work and maintaining it against the latter, said device including a first cylinder element fixedly connected to the working implement, a second cylinder element having a piston thereon and movable within the cylinder element which is fixed to the implement, said first and second cylinder elements each having an end more remote from the connection of said first cylinder element to the working implement and said end of said second cylinder element projecting through said end of said first cylinder element, an element having a piston at one end and an external abutment-engaging member at its other end, said last mentioned element slidably received in said second cylinder element and extending through the aforesaid end of said second cylinder element, said several elements being coaxial, and means for supplying fluid to said feed device to effect extension thereof from a relative position in which all of said elements are intersected by a plane to which the axes of the elements are perpendicular to another relative position in which such plane intersects not more than two of said elements, said means including means for subjecting said last mentioned element constantly to fluid pressure during the entire period of advance of said implement.

14. In combination with a member to be moved of an expansible, fluid operated mechanism operatively connected to the member comprising, a plurality of coaxially arranged devices cooperating to form an extensible mechanism, one of said devices adapted to act as an abutment engaging member, another of said devices movable longitudinally relative to said one of said devices and adapted to move the member to be moved, still another of said devices movable longitudinally with respect to each of said devices for moving the member to be moved, one of said first two named devices constituting both a piston and cylinder device and providing an effective area adapted to be subjected to fluid pressure for producing a force to effect movement of the member to be moved, said still another of said devices providing an effective area adapted to be subjected to fluid pressure for producing a second force equal to said first force to effect further movement of the member to be moved, and means for admitting fluid pressure in said mechanism for acting upon said effective areas.

References Cited in the file of this patent

UNITED STATES PATENTS

| | | |
|---|---|---|
| 786,409 | Coon | Apr. 4, 1905 |
| 1,289,795 | Johnson | Dec. 31, 1918 |
| 2,208,025 | Feucht | July 16, 1940 |